United States Patent
Otis et al.

(10) Patent No.: US 11,106,682 B2
(45) Date of Patent: Aug. 31, 2021

(54) DECISION PLATFORM FOR DIRECTED INFORMATION DELIVERY

(71) Applicant: Target Brands, Inc., Minneapolis, MN (US)

(72) Inventors: Collin Otis, Minneapolis, MN (US); Mandeep Waraich, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 676 days.

(21) Appl. No.: 15/782,646

(22) Filed: Oct. 12, 2017

(65) Prior Publication Data
US 2019/0114344 A1 Apr. 18, 2019

(51) Int. Cl.
| | |
|---|---|
| *G06F 17/00* | (2019.01) |
| *G06F 16/2457* | (2019.01) |
| *G06F 17/18* | (2006.01) |
| *G06N 7/00* | (2006.01) |
| *G06F 16/2453* | (2019.01) |
| *G06F 16/33* | (2019.01) |

(52) U.S. Cl.
CPC ...... *G06F 16/2457* (2019.01); *G06F 16/2453* (2019.01); *G06F 16/3347* (2019.01); *G06F 17/18* (2013.01); *G06N 7/005* (2013.01)

(58) Field of Classification Search
CPC combination set(s) only.
See application file for complete search history.

(56) References Cited

U.S. PATENT DOCUMENTS

| | | | |
|---|---|---|---|
| 6,981,040 B1 * | 12/2005 | Konig | G06N 20/00 |
| 8,065,184 B2 | 11/2011 | Wright et al. | |
| 8,725,752 B2 | 5/2014 | Chakrabarti et al. | |
| 8,738,436 B2 | 5/2014 | Tuladhar et al. | |
| 9,549,017 B2 | 1/2017 | Zhang et al. | |
| 2012/0173366 A1 * | 7/2012 | Soroca | G06Q 30/02 |
| | | | 705/26.3 |
| 2014/0059226 A1 | 2/2014 | Messerli et al. | |
| 2016/0055252 A1 * | 2/2016 | Makeev | G06F 16/24578 |
| | | | 707/733 |

OTHER PUBLICATIONS

He, Xinran et al., Practical Lessons From Predicting Clicks on Ads at Facebook, (Facebook), 2014, 9 Pages.
Edelman, Benjamin et al., Internet Advertising and the Generalized Second-Price Auction: Selling Billions of Dollars Worth of Keywords, Aug. 1, 2006, 25 Pages.

\* cited by examiner

*Primary Examiner* — Tuankhanh D Phan
(74) *Attorney, Agent, or Firm* — Merchant & Gould P.C.

(57) ABSTRACT

A decision platform can be a computer-implemented platform for predicting and increasing the likelihood that directed information is relevant to a user or device. The decision platform can have capabilities for predicting rates of interactivity with the directed information updating models, and reacting to directed information inventory changes in real-time without human intervention. The decision platform can use a three-dimensional logistic regression model to predict interactivity based in part on a user interactivity rate, a directed information interactivity rate, and a placement interactivity rate.

20 Claims, 5 Drawing Sheets

DECISION PLATFORM FOR DIRECTED INFORMATION DELIVERY

BACKGROUND

When connected to the Internet, users, and user devices, demand a wide variety of types of information provided by a wide variety of types of sources. For example, information may be requested by a computing device based on the computing device's activity, e.g., credential information, certificates, etc.; similarly, information may be requested by a user as well, based on the user's activity, e.g., various content from a variety of different sources.

Increasingly, efforts are made to deliver information more efficiently to users and/or devices. Such efforts can include providing directed information to a user or device. Directed information includes, for example, information that is selected specifically for a user or user device based on information about that user or device, and which is selected from among information that is provided by a plurality of different sources. Such directed information can be provided as a supplement to primary information that is specifically requested by the user or device. The directed information can be selected on behalf of the user or device, for example, based on information about the user or similar users, or for a device based on activity of the device or similar devices. This has resulted in advances in online information storage, selection, and retrieval across computing platforms, e.g., on webpages, smartphone applications, or other locations. Often, the goal of such information selection and delivery systems is to predict and increase the likelihood that the information provided to the user is relevant to the user or device, for example measured based on objective feedback from the system indicating that the information is relevant. This can include, for example, tracking a level of interactivity of the user or similar users with the directed information in another delivery instance, such as by selecting a link, visiting a website, navigating toward, downloading, installing an application, or otherwise interacting with the information.

While there are some similarities between online and offline directed content delivery for users, device-specific directed content delivery is unique to an online context. Furthermore, in both user and device contexts, the customizability and feedback speed of online directed information delivery has caused this technology to diverge from pre-Internet technology. For example, where traditional information delivery is static, online information delivery is often customized each time a visitor causes to load across a network (e.g., fetched from a server and sent to a client device).

Given the complexity of delivering appropriate directed information, particularly in a manner that complements primary information requested by the user or device, companies traditionally send directed information to third parties for hosting and rely on the third parties to analyze the directed information and select optimal delivery strategies for a given user from a pool of possible directed information from among the various sources. Such directed information sources may be scored, prioritized, or may even generate revenue based on a level of interactivity with respect to the directed information that is provided. However, there are opportunities for improvement in online information delivery technologies, to further improve the accuracy and interactivity of users and devices with such directed information, and in particular directed supplemental information.

SUMMARY

The technology of this disclosure includes improvements to online delivery of directed information, and in particular directed information that is intended to supplement requested information being delivered to a user and/or a user device. In specific examples, a decision system for online directed information delivery is usable to predict and increase the likelihood of interaction with respect to directed information that is selected for delivery. Disclosed technologies also include a system for predicting interactivity, updating models, and reacting to inventory changes, all in real-time without intervention. The platform can use a logistic regression prediction model to predict directed information interactivity rates. The logistic regression model can be three-dimensional and be based in part on an interactivity rate with a user, with the directed information, or with specific placement types. A second-price auction based on the second place expected revenue with first place predicted interactivity to derive an interactivity that is normalized to the second-place bid can be used.

In one aspect, a computer-implemented method includes obtaining a request for directed information associated with a user to be provided to a user device in association with primary information; obtaining information regarding the user; obtaining an inventory of directed information, the inventory if directed information describing directed information from a plurality of different directed information providers; and generating a recommendation for delivery of a selected piece of directed information from among the inventory, wherein generating the recommendation involves performing a three-dimensional logistic regression analysis on the inventory based in part on known information about the user. In another aspect, there is a non-transitory computer readable medium comprising instructions that, when executed by a processor, cause the processor to perform the method.

In a second aspect, a computer-implemented method includes obtaining directed information from a source of directed information, the source being from among a plurality of different sources of directed information; extracting text from the directed information received from the source; generating a directed information word vector from the extracted text; mapping the directed information to a product; assessing a strength of the relationship between the directed information and the physical object of prospective interest to a user based, in part, on the directed information word vector. In another aspect, there is a non-transitory computer readable medium comprising instructions that, when executed by a processor, cause the processor to perform the method.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

Figure 1:
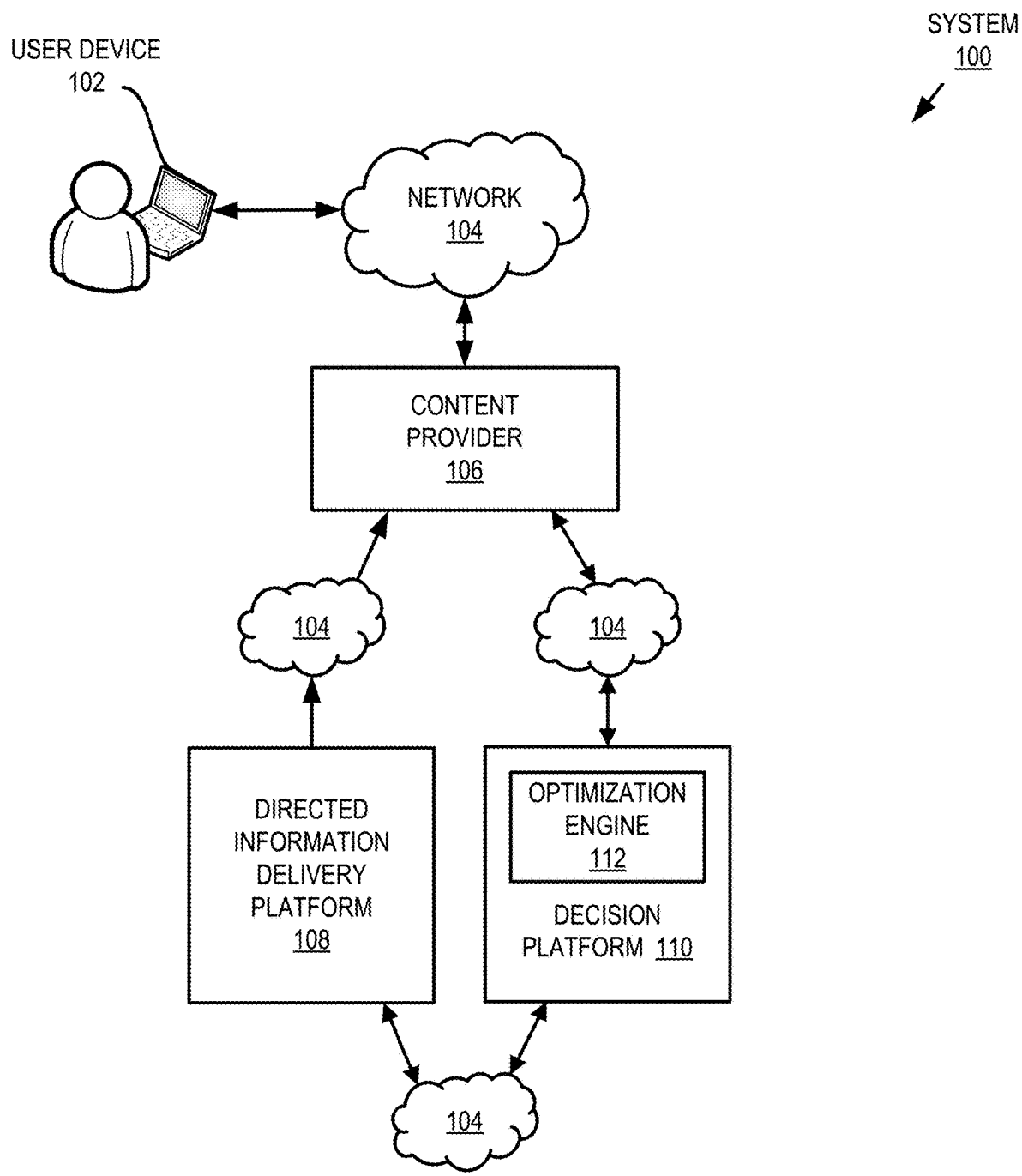
FIG. 1 illustrates an example online directed information delivery system.

Disclosed technology includes software decision platforms for online directed information delivery. The decision platforms can be configured to predict and optimize a likelihood of a user taking an action with respect to directed information, such as viewing the directed information, accessing a link associated with the directed information, or otherwise causing the user device to interact with or respond to the directed information.

In some examples of the disclosed technology, the decision system can be configured as an in-house decision system. For example, an organization can implement the decision system to coordinate directed information received from various third party sources internally rather than relying on a third-party to make these decisions. This can provide advantages over outsourcing such decision making by improving data security by reducing the amount of data that leaves the organization, as well as by ensuring that third party decision platforms do not provide inappropriate directed information in association with primary information that may be delivered to users or devices by the organization. Furthermore, because users and user devices may interact with directed information and primary information in various ways, there are a number of different types of interactivity that can be monitored and measured by the organization that may not be preferably to provide to a third party decision platform, for example due to security concerns.

Interactivity measurements associated with directed information and primary information and relating to users or user devices can be measured in a number of different ways. For example, taking an action with respect to directed information (e.g., accessing a link provided as directed information), can be measured in terms of costs, such as a measured cost per click (CPC), cost per mille (CPM), and cost per action (CPA). CPC refers to a cost to a source associated with user selection of directed information. CPM refers to a cost to the source associated with a number of instances in which the directed information is selected by the decision platform to be provided to a user or user device. CPA refers to the cost to a source associated with a specific type of interactivity occurring in association with directed information; in some cases, this can include additional interactivity beyond a mere user click on the directed information, and instead may be associated with an action taken by the user or user device to download an application, subscribe to a service, or receive information regarding a physical product or service, among others.

In some examples of the disclosed technology, the decision system can be configured for providing a decision system as a service to third parties. The decision system can be used to select directed information for delivery in association with primary information that describes physical objects hosted online. For example, primary information can describe a product or service to a user, or be information otherwise specifically requested by the user or user device. The directed information can then be information determined, by the decision system, to be related to the primary information, and which is intended to maximize user or device interactivity with such directed information. The directed information can also describe the physical object or other types of physical objects or services, and can include textual data, images, metadata, and other types of information that may be relevant to a user or user device.

In one example application of such a decision platform, a user may request information (primary information) regarding a physical object, e.g., butter. The information about butter may be provided directly by the entity hosting the decision platform. The decision platform will determine, based on what is known about that object, as well as the user, and interactivity rates associated with directed information, one or more pieces of directed information that may be delivered to the user in conjunction with the primary information. For example, a user may be presented with directed information that could include a link to information about butter or different brands of butter that are provided by third party sources, a health notice regarding consumption of butter that is provided by a government agency, information about margarine as compared to butter, or other similar types of information. The directed information that is selected may be based, for example, on a user's history of interactions with directed information, the rate at which specific directed information is interacted with (the rate at which a user may interact with or request more information in association with, e.g., health notices such as the one mentioned above), or may be based on a perceived importance of delivery of the directed information by the source of the directed information. For example, a health notice may have a higher "value" importance than links to other brands of butter, so the source of the health notice may elect to prioritize that directed information, for example by identifying the information as important, paying the organization to increase its visibility, or otherwise increasing its rate of selection by the decision platform.

In another example application of such a decision platform, a user device may request a security certificate from the organization to interact with that organization's data assets. The decision platform may determine that, based on historical activity of the user device or other user devices (e.g., based on click stream data, cookie data, or other activity information) the user device will likely require additional certificates to third party supplementary sites, and can provide one or more such certificates in conjunction with the primary certificate to provide the user device with likely complementary information to that information which is specifically requested by the user device.

To facilitate the selection of such directed information, the decision system can use algorithms configured to: map the directed information to a description of a physical object, extract text from the directed information, and assess the strength of the relationship between the directed information and the physical object using the word vectors created from a description of the physical object and the directed information. Based on the assessed strength, directed information can be selected from a pool of different types of directed information from different information sources. In this manner, relevant directed information may be selected and used, which can benefit the user experience (e.g., by not having the user see irrelevant content), benefit the source of directed information (e.g., by having the directed information seen by interested users), benefit the provider of the decision platform (e.g., by connecting users with relevant content), and/or benefit the user device (e.g., by providing to the user device supplemental information that may likely be required when the user device requests specific primary information)

In some examples, the decision platform can facilitate negotiation of delivery priority of directed information to sources of that directed information. The prioritization can be selected using an auction system among sources competing for prioritization. In some examples, a "winner" or prioritized source, is the source with a highest bid and pays the price bid. In other examples, winner of the auction is the party with the highest bid, but the party only pays the price bid by the party with the second highest bid. This can encourage parties to enter their true maximum bid because they would rarely actually end up paying that amount. Applied in a cost-per-click (CPC) model, the CPC for an impression can be based on the CPC for the equivalent second price on an particular instance in which directed information is delivered (e.g., the directed information being fetched) basis:

$$CPC = \frac{P_{SecondPlace} \times CPC_{SecondPlace}}{P_{Winner}}$$

The systems and methods of disclosed technologies can be implemented in a variety of ways, including using a microservices architecture, which can provide several advantages relating to customization and scalability.

FIG. 1 illustrates an example online directed information delivery system 100. The system 100 includes a user device 102 connected over a network 104 to a content provider 106. The content provider 106 can generally be any kind of provider of content, including audio content, video content, text content, image content, interactive content, other kinds of content, and combinations thereof. The content can include directed information, as well as the primary content that is a focus of the content provider (e.g., an online shopping content provider provides shopping content, a video game smartphone app provides gaming content, etc.). Although the directed information can be provided directly by the content provider 106, in many examples, such directed information can be hosted or otherwise provided by a separate directed information delivery platform 108. This can include the content provider 106 obtaining the directed information, and mixing the directed information with the primary content to provide to the user.

Selecting, placing, and providing the directed information by the content provider 106 can be facilitated by a decision platform 110. Decision platform 110 can provide an optimization engine 112, among other capabilities. The decision platform 110 can be connected to the directed information delivery platform 108 over the network 104. The decision platform 110 can communicate with the directed information delivery platform 108 to facilitate selecting, placing, and providing of the directed information (e.g., displaying or otherwise presenting the directed information at the user device 102) in association with the content provided by the content provider 106.

Although the content provider 106 is shown as being separate from the user device 102, it need not be. For example, in some examples the content provider 106 may be a smartphone application running on the user device 102. Along with providing content associated with the application, the content provider 106 may also provide directed information to the user over the user device 102. In this manner, the content provider 106 may connect to the directed information delivery platform 108 to fetch and provide the directed information to the user or device, e.g., via the user device 102.

The user device 102 can be any device suitable for receiving content and directed information, e.g., for receiving content for use by the device or user from the content provider 106, and optionally providing such content to a user of the device 102. For instance, the user device 102 can be a smartphone, a laptop computer a desktop computer a smart home device, among other devices. An example of a computing environment that may be suitable for implementing one or more aspects of the user device 102 is shown and described in relation to FIG. 5.

The network 104 is an electronic communication medium that facilitates communication between multiple different devices. The network 104 can include links between multiple computing devices and can include a variety of different kinds of hardware (e.g., routers, hubs, servers, etc.) or software to connect the devices. The network 104 can vary in scope and configuration. In some examples, the network 104 is a local area network, a wide area network (e.g. the Internet), or an intranet, among others.

The content provider 106, directed information delivery platform 108, and the decision platform 110 can all be implemented as part of a same or different computing environment. In many embodiments, the computing environment may be a server or a virtual machine running on a server, but other implementations may also be used. An example of an architecture of a computing environment for the decision platform 110. In another example of a computing environment is provided in FIG. 5.

The optimization engine 112 of the decision platform 110 can be configured to optimize the output of the decision platform. In some examples, the decision platform 110 can be configured to facilitate selection of specific directed information from the directed information delivery platform 108 to place in an in association with content made available by the content provider. In this example, the optimization engine 112 can facilitate optimal selection of directed information, e.g., the directed information for which interactivity is maximized or otherwise prioritized. In addition, or alternatively, the optimization engine 112 can facilitate selection of an directed information that is relevant to the primary content being provided by the content provider. Selection can be based on multiple factors including particulars of the spot, guest, and context. In an example, the selection is improved by evaluating interactivity in real time (e.g., at the time the directed information is fetched). The optimization engine 112 can balance exploration with exploitation. For instance, the optimization engine 112 can set limiters on relevancy, to limit the selection of directed information that provide high expected interactivity but would nonetheless be considered irrelevant in a given context for a given user or device, e.g., relative to the primary content provided to the user device 102.

In an example use where interactivity is judged in cost-per-click context, the optimization engine 112 can be configured to select the directed content that maximizes the product of the probability that a user or user device will interact with the directed content, multiplied by an ascribed value to the provider of the directed content of delivery of that directed content to the user and/or device. For example, the optimization engine 112 can be configured to solve the following equation:

$$\text{ContentToShow} = \text{argmax}_a (P_p, i\{\text{click } a | \text{impress } a\} \times \text{bid}\{\text{click } a\})$$

For all directed information a in A, for a given placement p in P, and for a given guest i. Where the utility is:

$$u_p,I,a = P_p,i\{click\ a|impress\ a\} \times bid\{click\ a\}$$

The same equations can be made applicable to impression-based delivery of directed information by setting the bid to the identity matrix.

In some examples, the equation can be used with generic-event-based content optimization (including both directed information and primary content delivered to a user or device) by generalizing the utility function inside the argmax function:

$$ActionToTake = argmax_a(\Sigma(P_p i\{outcome\ on\ a|action\ a\} \times reward\{event\ on\ a\}))$$

So, for example, the event may be one or more events leading to lifetime value (LTV), a purchase, or other events. The optimization engine 112 can even be extended as a general real-time decision framework for other applications (providing a promotion, providing faster shipping, etc.).

Figure 2:
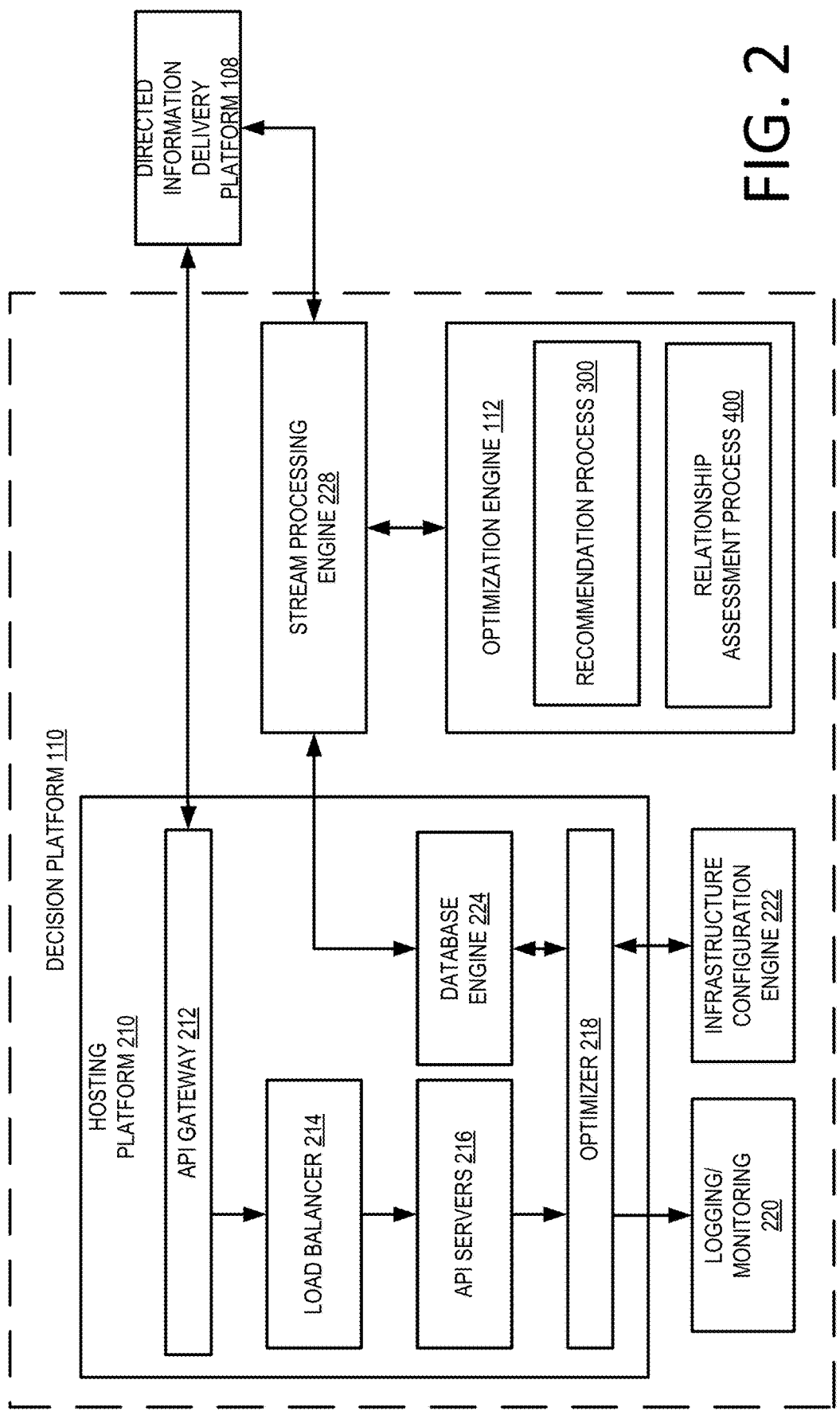
FIG. 2 illustrates an example architecture of the decision platform of the directed information delivery system of FIG. 1.

FIG. 2 illustrates an example architecture of the decision platform 110 of the directed information delivery platform of FIG. 1. The decision platform 110 can include a hosting platform 210. The hosting platform 210 is a platform for hosting one or more microservices associated with the decision platform 110. In an example, the hosting platform 210 is based on cloud delivery software, such as SPINNAKER by NETFLIX, INC. The hosting platform 210 can include a variety of components.

In an example, the hosting platform can include an API gateway 212. The API gateway 212 can be a component of the hosting platform 210 configured to receive, process, and otherwise handle API calls for the hosting platform 210. For example, the API gateway 212 can manage API calls related to creating, reading, updating, or deleting directed information. For example, the API gateway 212 can receive an API call associated with a request for directed information from the content provider 106. The API gateway 212 can then facilitate the processing of the request by forwarding it through the appropriate portions of the decision platform 110. For example, the API gateway can receive the request for directed content and send an associated signal to a load balancer 214.

In an example, the API gateway 212 of the decision platform 110 can implement an API endpoint for selecting directed information. This "get ad" API can be used by the content provider 106, directed information delivery platform 108, or others to obtain the correct directed information to show given particular primary content, guest, and context, among other information. The response can be a universally unique identifier (UUID) associated with directed information. The UUID can be provided to a tracking system to facilitate matching responses to interactivity to billing.

In an example, a request for directed information can be formatted using a customized POST request, but other configurations may also be used. In an example, the request can include information regarding a channel ID, a channel type, a placement position, a search term, a product identifier, and a category, among other information. An example POST request can be:

directedinformation.example.com/v1/ad?channelid= 0r784309u234&channeltype=cookieid&placement= pdp_lg_1&placement=pdp_rg_1&searchTerm= searchterm&tcin=234134&category: 0891037

And an example associated response can be:

```
{
responseUuid:0187934hdqwef2343
directedinformation:
    {
    pdp_lg_1:08738097,
    pdp_rg_1:08738031
    }
}
```

In another example, the API endpoint can provide endpoints for creating, reading, updating, or deleting directed information. These endpoints can take a variety of parameters as input, including a placement identifier and a size of the directed information.

A variety of information can be obtained for each piece of directed information, including but not limited to status of the directed information (e.g., whether it is active), a line item identifier, a name, associated keywords, related physical objects that may also be related to primary content, number of placements with primary content, number of user interactions, size or length of the directed information, and bid, among others.

The load balancer 214 is a component of the hosting platform 210 configured to facilitate balancing traffic among one or more API servers 216. In an example, the load balancer 214 can be implemented using ELASTIC LOAD BALANCER as provided by AMAZON WEB SERVICES, INC.

The API servers 216 can be one or more servers configured to respond to API calls. For example, API calls received over the API gateway 212 can be sent to a load balancer 214 and assigned to an API server 216 for taking an action with respect to the API call. The API servers can be implemented in a variety of ways including but not limited to virtual or physical servers.

The API servers 216 can cooperate with one or more optimizers 218 for facilitating optimization of performance of the API servers 216. For example, the real-time optimizer may cooperate with a logging/monitoring service 220. The logging/monitoring service 220 can collect and process logs an event data from the decision platform 110 and components thereof. The logging/monitoring service 220 can further include the ability to search and analyze logged or monitored data. In some examples, the logging/monitoring service 220 can be implemented using the ELK STACK provided by ELASTICSEARCH BV, including ELASTIC SEARCH for storing and searching data, LOGSTASH for ingesting the data, and KIBANA for visualizing the data. The optimizer 218 can also coordinate with an infrastructure configuration engine 222. The infrastructure configuration engine 222 can implement one or more services for configuring the various aspects the decision platform 110 including but not limited to traffic splitting, service discovery, and configuration. In an example, the infrastructure configuration engine can be implemented using CONSUL by HASHICORP, INC.

The decision platform 110 can further include a database engine 224. The database engine 224 can be an engine configured to provide data handling services, such as managing storage of data within one or more databases. In an example, the database engine 124 is implemented using a distributed NoSQL database system, such as CASSANDRA by the APACHE SOFTWARE FOUNDATION.

The decision platform 110 can further include a stream processing engine 228. These components can cooperate to facilitate the processing of streams of data throughout the various components and microservices of the decision platform 110. For example, the stream processing engine 228 can facilitate movement of data among the hosting platform 210, optimization engine 112, and the directed information delivery platform 108. The stream processing engine 228 can be implemented in a variety of different ways, including but not limited to through the use of KAFKA by the APACHE SOFTWARE FOUNDATION to act as a distributed streaming platform. The stream processing engine 228 can further include messaging brokers, key-value stores (e.g., implemented using ZOOKEEPER by the APACHE SOFTWARE FOUNDATION)

The optimization engine 112 can implement a variety of processes and algorithms to carry out aspects of disclosed technology. For example, the optimization engine 112 can include a recommendation process 300 and a relationship assessment process 400.

Figure 3:
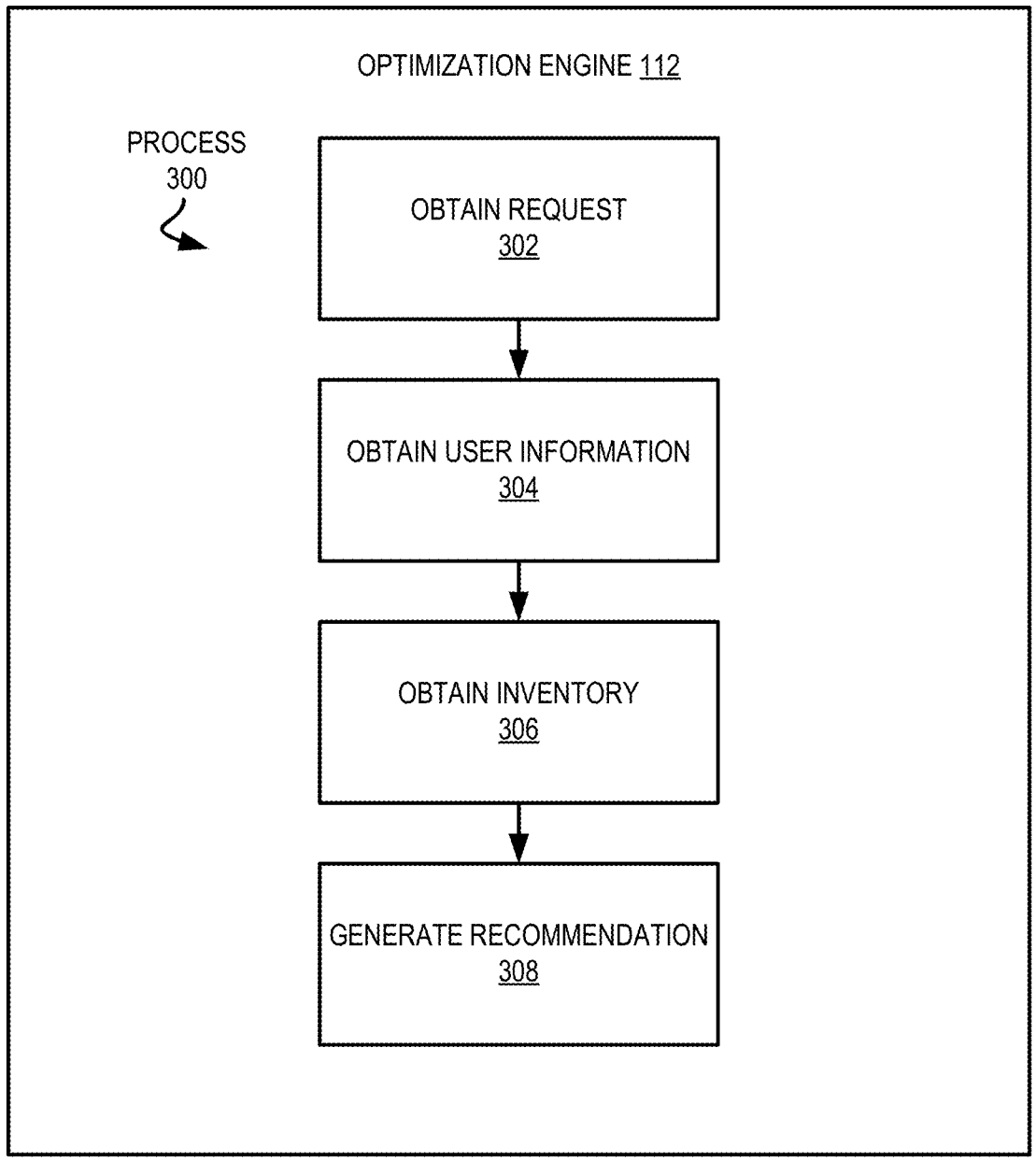
FIG. 3 illustrates an example process for recommending directed information for delivery to a user or device.

FIG. 3 illustrates an example process 300 for recommending directed information. The process 300 can begin with operation 302, which involves obtaining a request for directed information. For example, the request can be received from a content provider (e.g., content provider 106) to provide directed information to a user or user device. The request can be obtained in a variety of ways. For example, the content provider can send a request to a decision platform (e.g., decision platform 110) using an API associated with the decision platform (e.g., over the API gateway 212).

The request for the directed information can include a variety of data. For example, the request can include metadata regarding the kind of directed information requested. This can include a type of directed information(e.g., text, audio, video, image, metadata, application, or combinations thereof), a size of the directed information(e.g., the size of the location in which the directed information will be placed, if text/image/video), and other information. Following operation 302, the flow of the process 300 can move to operation 304.

Operation 304 involves obtaining user or device information. This can include obtaining information that may be useful for targeting in directed information to the user or device to which the directed information will be delivered. The user information is provided with the request for directed information, acquired separately, or combinations thereof. Such information can include, in the case of a user, known or inferred information about the user such as the user's likes, dislikes, age, gender, geographic location, prior responses to directed information (e.g., propensity to interact with directed information), demographic information, and other information. The obtained information can also include, in the case of a device, device characteristics, such as make/model, platform, operating system and operational history. The obtained information may also include user session information that includes information regarding recent user activity. The user session information can include information relating to the user's clickstream, device type, and how the user came to arrive at the directed information(e.g., based on URL referrer data where the directed information is to be displayed, e.g., on a webpage), among other information. Following operation 304, the flow of process 300 can move to operation 306.

Operation 306 involves obtaining an directed information inventory. This involves obtaining a pool of directed information that may be presented in response to the request for directed information. This can involve querying an directed information provider (e.g., directed information delivery platform 108) to obtain a list of available directed information. In some examples, this can involve obtaining the directed information inventory based in part on the request data (e.g., obtaining directed information inventory that fits the size and type needed to fulfill the request of operation 302) and based in part on the obtained user or device information. Following operation 306, the flow of process 300 can move to operation 308.

Operation 308 involves generating a directed information recommendation. Such a recommendation may include an identifier associated with a recommended directed information form the pool of directed information. Generating the recommendation can involve using information obtained in the request for the directed information, the user information, and the directed information inventory in order to generate a recommendation. The recommendation can be based on a variety different factors.

In an example, generating a directed information recommendation may involve predicting whether a particular user will interact with or otherwise take an action with respect to the directed information. The optimization engine 112 can recommend directed information with the highest (or sufficiently high) likelihood that the user will take an action with respect to that directed information. In an example, a probability whether a user will take an action is based on a logistic regression model. The logistic regression model can be trained or based on past performance. In an example, a three-dimensional logistic regression model is generated. The three dimensions can include a user CTR (Click Through Rate) dimension, a directed information CTR dimension, and a placement CTR dimension. The user CTR dimension can be a dimension based on user-specific data (or estimates of guest-specific data inferred from known data) associated with the user's CTR. The directed information CTR dimension can be a dimension based on directed information-specific data (e.g., actual or inferred past performance of the directed information, in terms of relevancy and interactivity) associated with a CTR on the directed information. The placement CTR dimension can be a dimension based on directed information-spot-specific data (e.g., actual or inferred past performance of directed information in the same position within/alongside primary content). The optimization engine 112 can estimate a CTR probability based on the logistic regression model. In some examples, the recommendation is based on CTR alone. In such examples, the CTR of the directed information can be estimated and the directed information with the highest CTR can be selected. In some examples, the recommendation is based on estimated yield, which can be expressed by the product of the CTR and the value of an interaction with the directed information. In some examples, the recommendation is based on a relevance of the directed information to the content with which it will be provided.

Once the recommendation is generated, the recommended directed information may be requested from the directed information platform to be provided to the content provider for combination with the content that the content provider is providing.

In some examples, the decision platform 110 and the optimization engine 112 can be configured to assess the relationship between directed information and primary content. For example, the decision system can be used to place directed information in association with inventory of an online marketplace. For example, the online marketplace may sell clothing products and the online marketplace may provide supplemental user information, in the form of directed information, in association with the clothing products or other physical objects presented in the online marketplace. It may be desirable for the marketplace to have directed information relevant to the products being sold.

Figure 4:
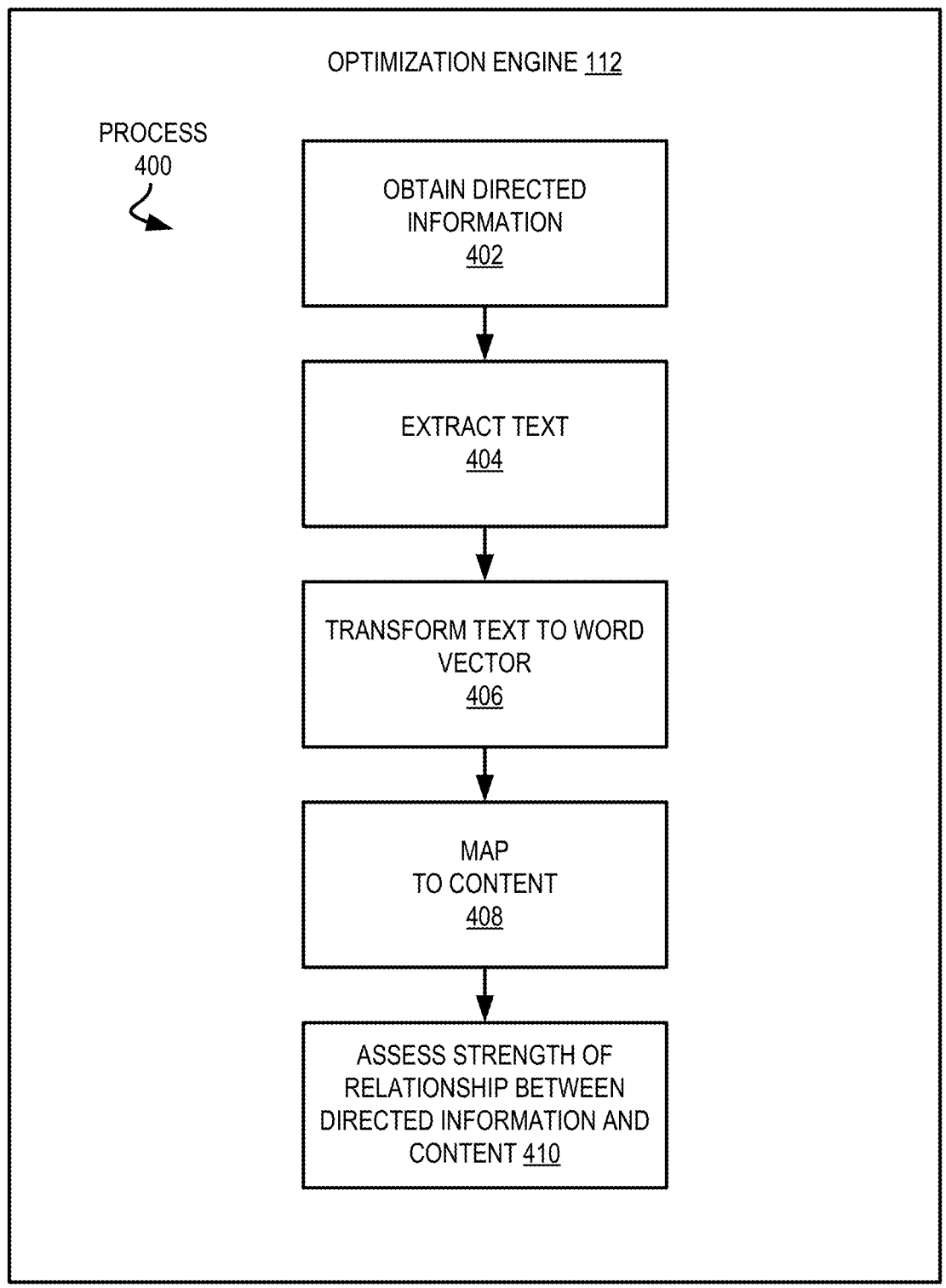
FIG. 4 illustrates an example process for assessing a relationship between directed information and requested content.

FIG. 4 illustrates an example process 400 for providing assessing the relationship between directed information and content, such as a product. The process 400 can begin with operation 402, which involves obtaining directed information. In some examples, the directed information is from a pool of directed information (e.g., as obtained through operation 306). The directed information can be obtained in a variety of ways, including from the directed information delivery platform 108. The process 400 can then move to operation 404.

Operation 404 involves extracting text from the obtained directed information. In some examples, this can involve extracting text from the directed information text directly (e.g., as may be the case with a textual form of the directed information), extracting text from metadata, extracting text from subtitles (e.g., where the directed information includes video content), extracting text from the directed information using optical character recognition (e.g., where the directed information includes image content), and extracting text descriptions from directed information using an image classifier (e.g., using a machine learning framework, such as a neural network, to determine what is shown in video or image content), among others.

Operation 406 involves transforming the text obtained from the directed information into a word vector or another kind of embedding for processing. In an example, the text can be transformed into a word vector using software such as WORD2VEC by Mikolov et al. or GLOVE by Pennington et al. The vectors can have a variety of different representations, including one-hot or distributed representations.

Operation 408 involves mapping the directed information to content (e.g., a product). The content can be, for example, video, audio, image, text, interactive, or other content. In some examples, the content can be associated with products of a marketplace associated with the directed information. The product may be one or more products or services or types of products or services. The mapping can involve, for example, determining a relevance between directed information and the content or product. For example, the word vector generated in operation 406 can be used to determine relevance between directed information and a product. In some examples, the directed information is already associated with the products (e.g., the creator of the directed information also associated it with a product). In other examples, the directed information can be associated with a physical object (e.g., a product or other object); in such cases, the directed information may describe or be supplementary to the physical object, which is described in text of primary content. Accordingly, the directed information can be associated with the physical object via a word vector relationship with the text of the primary content. Operation 410 involves assessing the strength of the relationship between the directed information and the one or more products or physical objects. The strength of the relationship can reflect a relative similarity between the directed information and the product or object. For example, there would be a stronger relationship where both the product and directed information are related to articles of clothing products then if one of them related to a car part and the other related to an article of clothing. The strength of relationship can also reflect a propensity for users to interact with the directed information or, more generally, a desire by the user to have the directed information and the primary content presented together. For example, there may be a relatively strong relationship where the product is a remote control that requires batteries and the directed information describes relevant batteries. In another example, a strong relationship may exist if the directed information were describing benefits of insurance for the product (e.g., where the product is a car).

The strength of the relationship can be expressed in a variety of ways. For example there may be a simple Boolean indicating whether it is true or not that there is a strong relationship between the two. In another example, the strength can be expressed on a percentage basis or other numeric scale. The strength of the relationship can be assessed by comparing the word vector created in operation 406 with a word vector associated with the product. In some examples, this can involve determining a distance between the two vectors in vector space.

The strength of the relationship between the two as determined in operation 410 can be used in a variety of ways. For example, it may be desirable to have directed information be selected based not merely on the potential for interactivity and potential of revenue from third parties based on the directed information but also based on relevance to what the user would want to see. For example, having highly interacted with but irrelevant directed information on a website can result in a poor user experience and ultimately drive users away. Therefore it can be of advantageous to not only consider potential interactivity with directed information but also the relevance of the directed information to the primary content provided to the user or device. As such, the assessed strength the relationship can be a factor in determining selection of directed information. For example, the directed information may be displayed in conjunction (or otherwise associated) with the product responsive to determining that the relevance exceeds a threshold.

Figure 5:
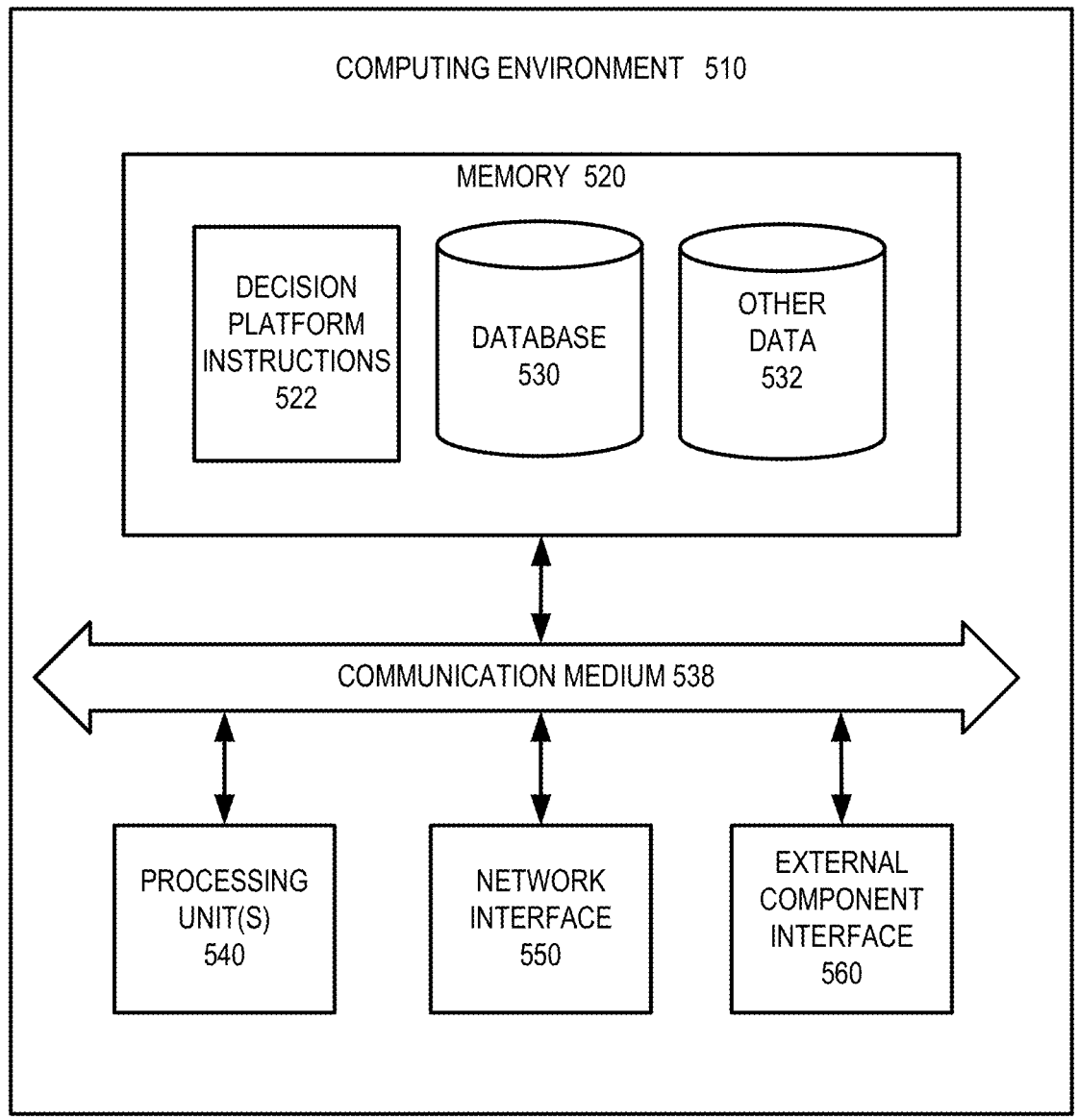
FIG. 5 illustrates an example system with which disclosed systems and methods can be used.

FIG. 5 illustrates an example system 500 with which disclosed systems and methods can be used. In an example, the user device 102, content provider 106, directed information delivery platform 108, and decision platform 110 can be implemented as one or more systems 500 or one or more systems having one or more components of systems 500. In an example, the system 500 can include a computing environment 510. The computing environment 510 can be a physical computing environment, a virtualized computing environment, or a combination thereof. The computing environment 510 can include memory 520, a communication medium 538, one or more processing units 540, a network interface 550, and an external component interface 560.

The memory 520 can include a computer readable storage medium. The computer storage medium can be a device or article of manufacture that stores data and/or computer-executable instructions. The memory 520 can include volatile and nonvolatile, transitory and non-transitory, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data.

The memory 520 can store various types of data and software. For example, as illustrated, the memory 520 includes decision platform instructions 522 for implementing one or more aspects of the decision platform described herein (e.g., as described in relation to FIGS. 1-4), database 530 (e.g., as described in relation to database engine 224 of FIG. 2), as well as other data 532. In some examples (e.g., where the computing environment 510 is a user device 102), the memory 520 can include instructions for obtaining content from a content provider and providing the content to a user. In some examples (e.g., where the computing environment 510 is a directed content delivery platform 108), the memory 520 can include instructions for acting as a directed content delivery platform or decision platform.

The communication medium 538 can facilitate communication among the components of the computing environment 510. In an example, the communication medium 538 can facilitate communication among the memory 520, the one or more processing units 540, the network interface 550, and the external component interface 560. The communications medium 538 can be implemented in a variety of ways, including but not limited to a PCI bus, a PCI express bus accelerated graphics port (AGP) bus, a serial Advanced Technology Attachment (ATA) interconnect, a parallel ATA interconnect, a Fiber Channel interconnect, a USB bus, a Small Computing system interface (SCSI) interface, or another type of communications medium.

The one or more processing units 540 can include physical or virtual units that selectively execute software instructions. In an example, the one or more processing units 540 can be physical products comprising one or more integrated circuits. The one or more processing units 540 can be implemented as one or more processing cores. In another example, one or more processing units 540 are implemented as one or more separate microprocessors. In yet another example embodiment, the one or more processing units 540 can include an application-specific integrated circuit (ASIC) that provides specific functionality. In yet another example, the one or more processing units 540 provide specific functionality by using an ASIC and by executing computer-executable instructions.

The network interface 550 enables the computing environment 510 to send and receive data from a communication network (e.g., network 104). The network interface 550 can be implemented as an Ethernet interface, a token-ring network interface, a fiber optic network interface, a wireless network interface (e.g., WI-FI), or another type of network interface.

The external component interface 560 enables the computing environment 510 to communicate with external devices. For example, the external component interface 560 can be a USB interface, Thunderbolt interface, a Lightning interface, a serial port interface, a parallel port interface, a PS/2 interface, and/or another type of interface that enables the computing environment 510 to communicate with external devices. In various embodiments, the external component interface 560 enables the computing environment 510 to communicate with various external components, such as external storage devices, input devices, speakers, modems, media player docks, other computing devices, scanners, digital cameras, and fingerprint readers.

Although illustrated as being components of a single computing environment 510, the components of the computing environment 510 can be spread across multiple computing environments 510. For example, one or more of instructions or data stored on the memory 520 may be stored partially or entirely in a separate computing environment 510 that is accessed over a network.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., portions, components, etc.) described with respect to the figures herein are not intended to limit the systems and methods to the particular aspects described. Accordingly, additional configurations can be used to practice the methods and systems herein and/or some aspects described can be excluded without departing from the methods and systems disclosed herein.

Similarly, where steps of a process are disclosed, those steps are described for purposes of illustrating the present methods and systems and are not intended to limit the disclosure to a particular sequence of steps. For example, the steps can be performed in differing order, two or more steps can be performed concurrently, additional steps can be performed, and disclosed steps can be excluded without departing from the present disclosure.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

The invention claimed is:

1. A computer-implemented method comprising:
obtaining a request from a content provider for directed information associated with a user to be provided to a user device in association with primary information, wherein the primary information is specifically requested by the user from the content provider and the directed information is requested by the content provider to supplement the primary information;
obtaining information regarding the user;
obtaining an inventory of directed information, the inventory of directed information describing directed information from a plurality of different directed information providers; and
generating a recommendation for delivery of a selected piece of directed information from among the inventory,
wherein generating the recommendation involves performing a three-dimensional logistic regression analysis on the inventory based in part on known information about the user.

2. The computer-implemented method of claim 1, wherein the three-dimensional logistic regression analysis includes an interactivity dimension associated with a rate of user interactivity with the directed information.

3. The computer-implemented method of claim 1, wherein the three-dimensional logistic regression analysis includes a user interactivity dimension, a directed information interactivity dimension, and a placement interactivity dimension.

4. The computer-implemented method of claim 1, wherein generating the recommendation involves maximizing a product of a probability that a user will take an action with respect to directed information multiplied by a value of the action taken with respect to the directed information.

5. The computer-implemented method of claim 4, comprising determining a relevance of the directed information to the user, wherein the maximizing is limited based in part on the determined relevance.

6. The computer-implemented method of claim 1, wherein the request is formatted as a POST request.

7. The computer-implemented method of claim 1, wherein the request comprises information regarding a channel ID, a channel type, a placement position, a search term, a product identifier, and a category.

8. A computer-implemented method comprising:
obtaining a request from a content provider for directed information associated with a user to be provided to a user device in association with primary information, wherein the primary information is specifically requested by the user from the content provider and the directed information is requested by the content provider to supplement the primary information;
obtaining the directed information from a source of directed information, the source being from among a plurality of different sources of directed information;
extracting text from the directed information received from the source;
generating a directed information word vector from the extracted text;
mapping the directed information to a physical object of prospective interest to a user;
assessing a strength of the relationship between the directed information and the physical object based, in part, on the directed information word vector.

9. The computer-implemented method of claim 8, further comprising providing the directed information in association with the physical object responsive to determining that the strength of the relationship exceeds a threshold.

10. The computer-implemented method of claim 8, wherein the directed information comprises an image element, and wherein extracting the text comprises applying optical character recognition to the image element.

11. The computer-implemented method of claim 8, wherein the directed information comprises an image element, and wherein extracting text comprises applying an image classifier to the image element to determine what is shown in the image element.

12. The computer-implemented method of claim 8, wherein assessing the strength of the relationship is further based, in part, on a comparison between the directed information word vector and a word vector associated with the physical object.

13. The computer-implemented method of claim 12, wherein the comparison between the directed information word vector and the word vector associated with the physical object comprises a determined distance between the vectors in vector space.

14. A non-transitory computer readable medium comprising instructions that, when executed by a processor, cause the processor to perform a method comprising:
obtaining a request for directed information from a content provider to be presented to a user in association with primary information, wherein the primary information is specifically requested by the user from the content provider and the directed information is requested by the provider to supplement the primary information;
obtaining information regarding the user;
obtaining a directed information inventory; and
generating a directed information recommendation,
wherein generating the directed information recommendation involves performing a three-dimensional logistic regression analysis on the directed information inventory based on the user.

15. The non-transitory computer readable medium of claim 14, wherein the three-dimensional logistic regression analysis includes interactivity dimensions.

16. The non-transitory computer readable medium of claim 15, wherein the interactivity dimensions comprise a user interactivity dimension, a directed information interactivity dimension, and a placement interactivity dimension.

17. The non-transitory computer readable medium of claim 14, wherein generating the directed information recommendation involves maximizing a product of a probability that a user will take an action with respect to directed information multiplied by the value of the action taken with respect to the directed information.

18. The non-transitory computer readable medium of claim 17, wherein the method further comprises determining a relevance of the directed information to the user, wherein the maximizing is limited based in part on the determined relevance.

19. The non-transitory computer readable medium of claim 14, wherein the request is formatted as a POST request.

20. The non-transitory computer readable medium of claim 14, wherein the request comprises information regarding a channel ID, a channel type, a placement position, a search term, a product identifier, and a category.

* * * * *